(12) United States Patent
Athad

(10) Patent No.: US 10,160,040 B2
(45) Date of Patent: Dec. 25, 2018

(54) CUTTING TOOL AND TRIANGULAR-SHAPED INDEXABLE CUTTING INSERT THEREFOR

(71) Applicant: Iscar, Ltd., Tefen (IL)

(72) Inventor: Shimon Athad, Maalot (IL)

(73) Assignee: Iscar, Ltd., Tefen (IL)

( * ) Notice: Subject to any disclaimer, the term of this patent is extended or adjusted under 35 U.S.C. 154(b) by 148 days.

(21) Appl. No.: 14/944,295

(22) Filed: Nov. 18, 2015

(65) Prior Publication Data

US 2017/0136549 A1 May 18, 2017

(51) Int. Cl.
*B23B 27/00* (2006.01)
*B23B 27/14* (2006.01)
(Continued)

(52) U.S. Cl.
CPC .......... *B23B 27/145* (2013.01); *B23B 27/045* (2013.01); *B23B 27/1614* (2013.01);
(Continued)

(58) Field of Classification Search
CPC ...... B23B 2200/3627; B23B 2200/049; B23B 2200/048; B23B 2200/0457;
(Continued)

(56) References Cited

U.S. PATENT DOCUMENTS

| 3,852,859 A | * | 12/1974 | Carpenter | ............. | B23B 27/065 407/101 |
| 4,169,690 A | * | 10/1979 | Kendra | ................. | B23B 27/065 407/103 |

(Continued)

FOREIGN PATENT DOCUMENTS

FR  1561415 A  3/1969

OTHER PUBLICATIONS

International Search Report dated Feb. 22, 2017, issued in PCT counterpart application (No. PCT/IL2016/051169).
(Continued)

*Primary Examiner* — Will Fridie, Jr.
(74) *Attorney, Agent, or Firm* — Womble Bond Dickinson (US) LLP

(57) ABSTRACT

A cutting tool having a tool holder, cutting insert and clamping member. The tool holder includes an elongated supporting surface extending in a rearward-to-forward direction. The cutting insert has a central portion and three cutting portions, the central portion having two opposing side surfaces and three spaced apart locating surfaces defining a first imaginary triangle. The cutting insert is indexable about a central axis intersecting the two side surfaces. Each locating surface intersects two of three bisector planes containing the central axis and bisecting respective corners of the first imaginary triangle, and the cutting edge of each cutting portion is located entirely outside of the first imaginary triangle. In each index position the clamping member is located entirely rearward of a first vertical plane containing the central axis and perpendicular to the rearward-to-forward direction, and one of the locating surfaces is in clamping contact with the supporting surface.

23 Claims, 6 Drawing Sheets

(51) Int. Cl.
*B23B 27/16* (2006.01)
*B23B 29/04* (2006.01)
*B23B 27/04* (2006.01)

(52) U.S. Cl.
CPC ...... *B23B 29/043* (2013.01); *B23B 2200/049* (2013.01); *B23B 2200/0423* (2013.01); *B23B 2200/165* (2013.01); *B23B 2200/323* (2013.01); *B23B 2200/369* (2013.01); *B23B 2200/3627* (2013.01); *B23B 2205/12* (2013.01)

(58) Field of Classification Search
CPC .......... B23B 2200/0423; B23B 27/145; B23B 27/065; B23B 27/1614; B23B 2205/12; B23C 2200/0466; B23C 2200/0477; B23C 5/207
See application file for complete search history.

(56) References Cited

U.S. PATENT DOCUMENTS

| | | | |
|---|---|---|---|
| 4,755,085 A | 7/1988 | Murén et al. | |
| 5,004,379 A * | 4/1991 | Little | B23B 27/065 407/113 |
| 5,308,197 A * | 5/1994 | Little | B23B 27/065 407/101 |
| 7,972,090 B2 * | 7/2011 | Jonsson | B23B 27/045 407/103 |
| 8,678,718 B2 * | 3/2014 | Hecht | B23B 27/1614 407/104 |
| 2008/0152441 A1 * | 6/2008 | Andersson | B23B 27/065 407/103 |
| 2010/0329800 A1 * | 12/2010 | Edler | B23B 27/145 407/114 |
| 2012/0201622 A1 | 8/2012 | Kocherovsky et al. | |
| 2013/0129433 A1 | 5/2013 | Matsumoto et al. | |
| 2013/0156516 A1 * | 6/2013 | Hecht | B23B 27/045 407/103 |
| 2013/0336734 A1 * | 12/2013 | Morgulis | B23B 27/065 407/102 |
| 2014/0050542 A1 * | 2/2014 | Zeeb | B23B 27/04 407/103 |

OTHER PUBLICATIONS

Written Opinion dated Feb. 22, 2017, issued in PCT counterpart application (No. PCT/IL2016/051169).

* cited by examiner

CUTTING TOOL AND TRIANGULAR-SHAPED INDEXABLE CUTTING INSERT THEREFOR

FIELD OF THE INVENTION

The present invention relates to a cutting tool and a triangular shaped indexable cutting insert therefor, for use in metal cutting processes in general, and for grooving, parting and on-edge threading operations in particular.

BACKGROUND OF THE INVENTION

Within the field of cutting tools used in grooving, parting and on-edge threading operations, there are many examples of polygonal shaped cutting inserts removably retained in an insert receiving pocket of a tool holder.

U.S. Pat. No. 5,004,379 discloses a cutting insert having a mount portion with at least three straight insert locating sides lying on the sides of an imaginary regular polygon, said insert having a radially outwardly extending arm at each of the corners of said imaginary polygon, with each arm having an outer edge and a pair of opposite sides that extend in a largely radially outward direction from the axis of said polygon, and with each arm forming a cutting edge at the intersection of the outer edge and each of the sides of the arm. The cutting insert is clamped in a tool holder recess having walls forming a plurality of straight holder positioning surfaces that abut said insert locating sides.

U.S. Pat. No. 5,308,197 discloses a cutting insert having a mount portion with a plurality of straight locating sides lying on the sides of an imaginary polygon that has an axis and corners, said insert having a largely radially outwardly extending arm at each of a plurality of said corners of said imaginary polygon, with each arm having a cutting edge, with each arm having an arm upper side extending substantially radially to said cutting edge, and with each arm having a lower side.

US 2013/0156516 discloses cutting tool assembly including a cutting tool and an indexable cutting insert having an insert index axis. The cutting insert includes parallel insert first and second sides connected by an insert peripheral surface that extends peripherally around the cutting insert. At least one clamping hole opens out to one or both of the insert first and second sides, and at least a portion of the clamping hole is in a clamping region of the cutting insert. The insert peripheral surface includes cutting edges that are spaced-apart and extend from the insert first side to the insert second side. Along a width direction, which is perpendicular to the insert first and second sides, each of the cutting edges is wider than the cutting insert, at least at the cutting region of the cutting insert.

It is an object of the present invention to provide an improved indexable triangular-shaped cutting insert.

It is also an object of the present invention to provide an improved cutting tool in which the triangular shaped cutting insert is removably secured to a tool holder with a high level of stability.

It is a further object of the present invention to position the triangular shaped cutting insert on the tool holder with a high level of accuracy and repeatability.

It is yet a further object of the present invention to index the triangular shaped cutting insert on the tool holder with a high level of efficiency.

It is yet still a further object of the present invention to provide an improved cutting tool configured to perform grooving and parting operations at large depths of insertion.

SUMMARY OF THE INVENTION

In accordance with the present invention, there is provided a cutting tool comprising a tool holder, an indexable cutting insert, and at least one clamping member,
  the tool holder comprising:
  a shank portion, and
  a holder portion connected to the shank portion, the holder portion having a blade-shaped front portion with an elongated supporting surface extending in a rearward-to-forward direction, and
  the cutting insert having a central axis around which the cutting insert is indexable, and comprising:
  a central portion having two opposing side surfaces and three spaced apart locating surfaces extending therebetween, the central axis intersecting the two opposing side surfaces,
  three cutting portions connected to the central portion, each cutting portion formed between two of the three locating surfaces and including a cutting edge, and
  a median plane located mid-way between the two opposing side surfaces of the cutting insert, the three locating surfaces defining a first imaginary triangle in a cross-section taken along the median plane,
  the cutting insert being removably securable to the holder portion in any one of three index positions by the at least one clamping member,
  wherein in each index position:
  the at least one clamping member is located entirely rearward of a first vertical plane containing the central axis and perpendicular to the rearward-to-forward direction, and
  one of the three locating surfaces is in clamping contact with the supporting surface.

Also in accordance with the present invention, there is provided an indexable cutting insert having a central axis around which the cutting insert is indexable, comprising:
  a central portion having two opposing side surfaces and three spaced apart locating surfaces extending therebetween, the central axis intersecting the two opposing side surfaces,
  three cutting portions, each cutting portion formed between two of the three locating surfaces and including a cutting edge, and
  a median plane located mid-way between the two opposing side surfaces, the three locating surfaces defining a first imaginary triangle in a cross-section taken along the median plane, wherein:
  the median plane intersects each cutting edge,
  three bisector planes containing the central axis bisect respective corners of the first imaginary triangle, two of the three bisector planes intersecting each locating surface, and
  in a side view of the cutting insert, each cutting edge is located entirely outside the first imaginary triangle and is not intersected by imaginary extensions of the three locating surfaces which define the first imaginary triangle.

BRIEF DESCRIPTION OF THE DRAWINGS

For a better understanding, the invention will now be described, by way of example only, with reference to the accompanying drawings in which chain-dash lines represent cut-off boundaries for partial views of a member and in which.

DETAILED DESCRIPTION OF THE INVENTION

Figure 1:
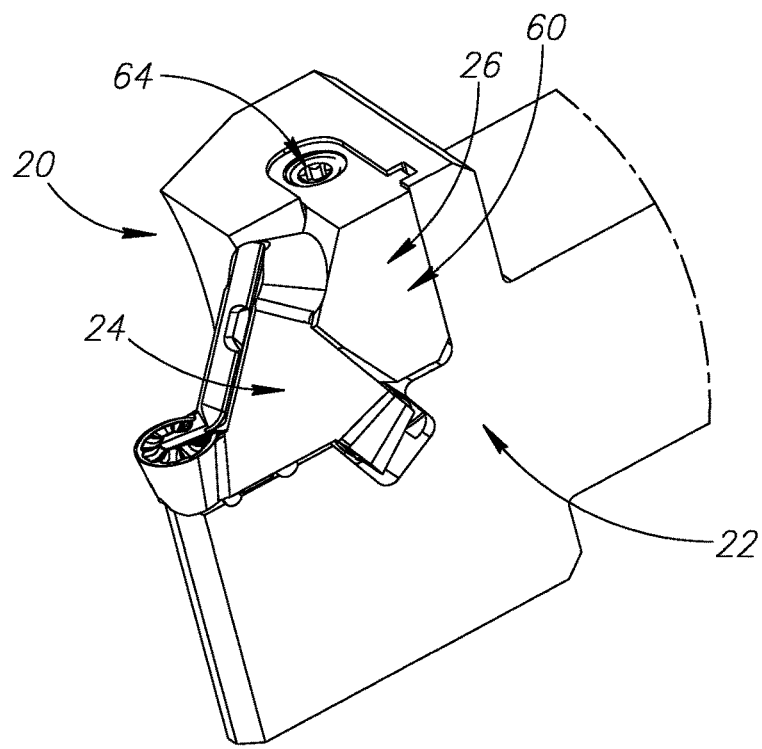
FIG. 1 is a perspective view of a cutting tool in accordance with some embodiments of the present invention.
Figure 2:
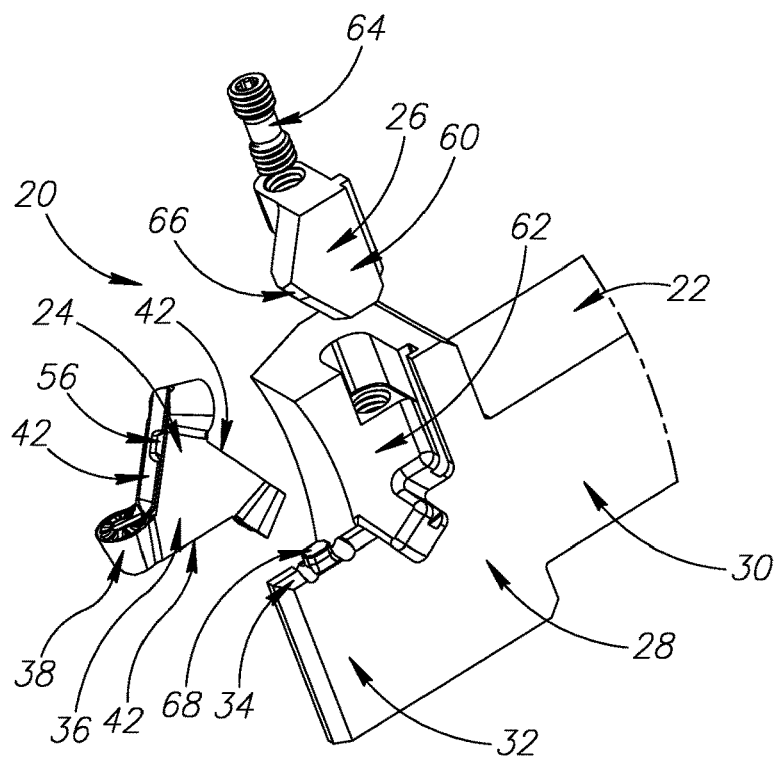
FIG. 2 is an exploded perspective view of the cutting tool shown in FIG. 1.

The present invention relates to a cutting tool 20 comprising a tool holder 22, an indexable cutting insert 24, and at least one clamping member 26, as shown in FIGS. 1 and 2.

Figure 3:
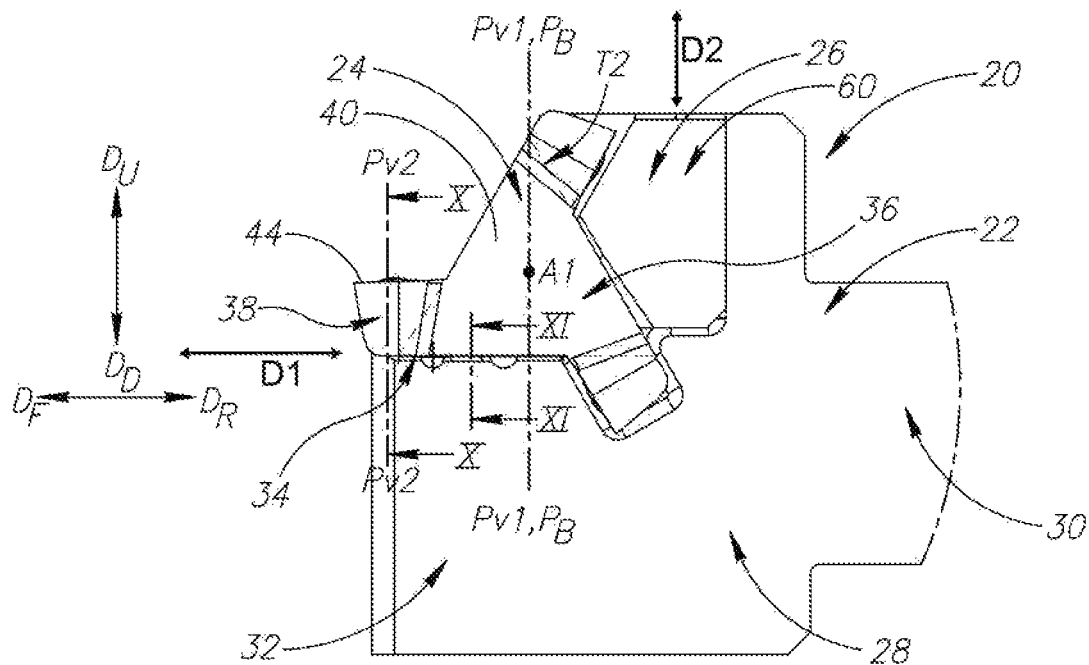
FIG. 3 is a side view of the cutting tool shown in FIG. 1.
Figure 4:
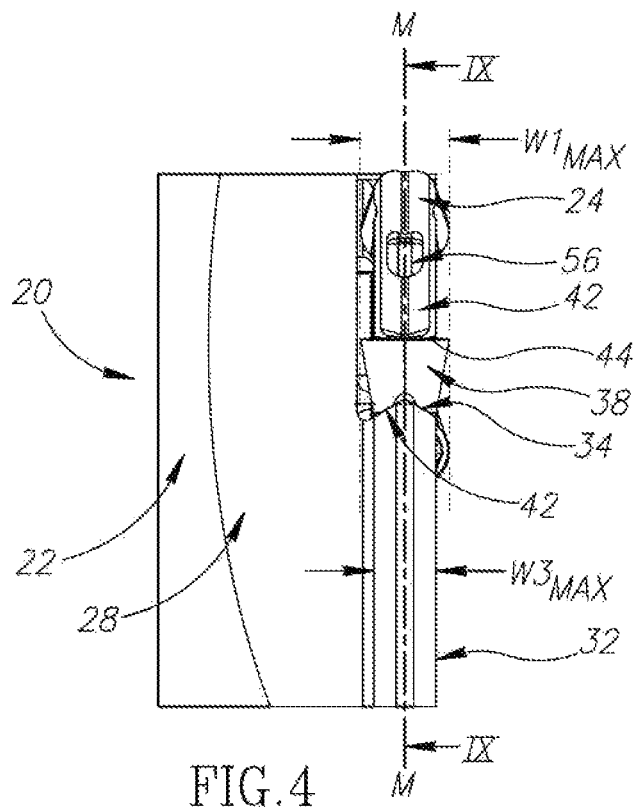
FIG. 4 is an end view of the cutting tool shown in FIG. 1.

According to the present invention, as shown in FIGS. 3 and 4, the tool holder 22 has a holder portion 28 connected to a forward end of a shank portion 30, the holder portion 28 having a blade-shaped front portion 32 with an elongated supporting surface 34. In a side view of the holder portion's front portion 32, the elongated supporting surface 34 extends in a first direction D1, which in this instance extends along a rearward-to-forward direction $D_R$, $D_F$ of the front portion 32.

In some embodiments of the present invention, the holder portion 28 and the shank portion 30 may be integral portions of the tool holder 22, and the shank portion 30 may extend rearwardly from the holder portion 28.

Figure 5:
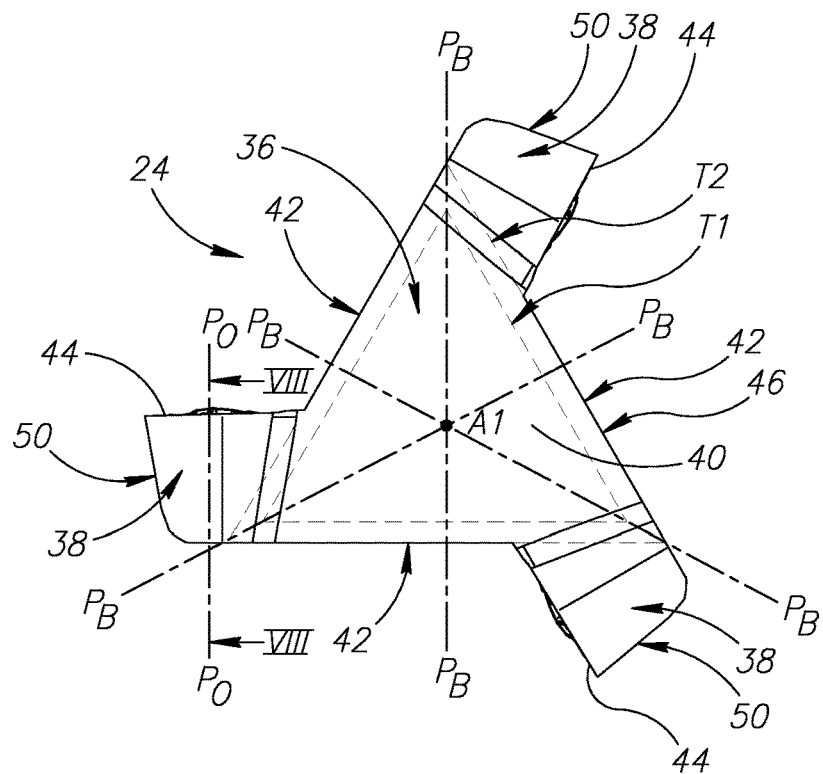
FIG. 5 is a side view of a cutting insert in accordance with some embodiments of the present invention.
Figure 6:
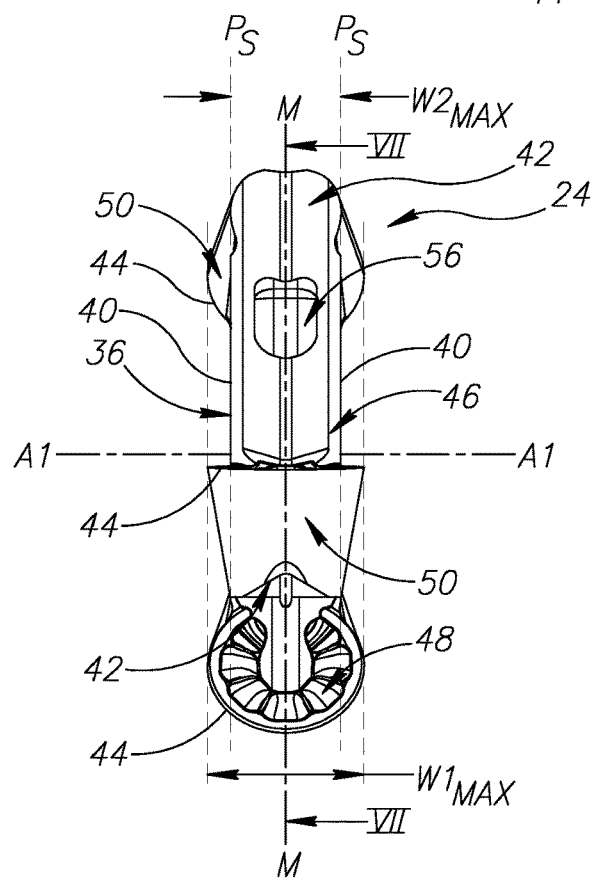
FIG. 6 is an end view of the cutting insert shown in FIG. 5, perpendicular to a bisector plane.

According to the present invention, as shown in FIGS. 5 and 6, the cutting insert 24 has a single central portion 36 and three cutting portions 38 connected thereto, the central portion 36 having two opposing side surfaces 40 and three spaced apart locating surfaces 42 extending therebetween, and each cutting portion 38 being formed between two of the three locating surfaces 42 and including a cutting edge 44.

In other words, the three locating surfaces 42 are portions of a continuous peripheral surface 46 extending between the two opposing side surfaces 40, being spaced apart by the three cutting portions 38.

In some embodiments of the present invention, the cutting insert 24 may preferably be manufactured by form pressing and sintering a cemented carbide, such as tungsten carbide, and may be coated or uncoated.

Also in some embodiments of the present invention, the cutting insert 24 may have exactly three cutting portions 38.

Further in some embodiments of the present invention, the three cutting portions 38 may be identical.

Yet further in some embodiments of the present invention, each cutting portion 38 may have a single cutting edge 44.

According to the present invention, the cutting insert 24 is indexable about a central axis A1 intersecting the two opposing side surfaces 40.

In some embodiments of the present invention, as shown in FIG. 5, the cutting insert 24 may exhibit three-fold rotational symmetry about the central axis A1.

As shown in FIG. 6, a median plane M is located mid-way between the two opposing side surfaces 40.

In some embodiments of the present invention, the median plane M may intersect each cutting edge 44.

Also in some embodiments of the present invention, as shown in FIG. 6, the cutting insert 24 may exhibit minor symmetry about the median plane M.

Further in some embodiments of the present invention, the two opposing side surfaces 40 may be parallel.

Figure 7:
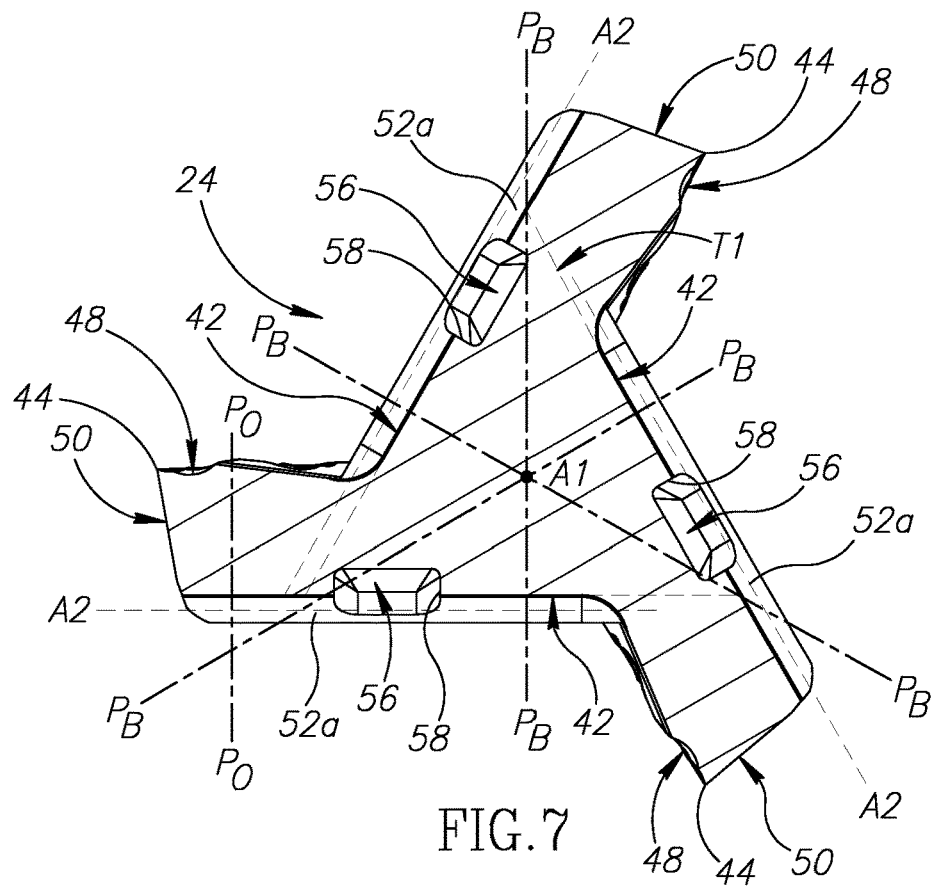
FIG. 7 is a cross-sectional view of the cutting insert shown in FIG. 6, taken along the line VII-VII.

According to the present invention, as shown in FIG. 7, the three locating surfaces 42 define a first imaginary triangle T1 in a cross-section taken along the median plane M.

Also as shown in FIG. 7, three bisector planes $P_B$ containing the central axis A1 bisect respective corners of the first imaginary triangle T1.

According to the present invention, as shown in FIG. 5, two of the three bisector planes $P_B$ intersect each locating surface 42, and in a side view of the cutting insert 24, each cutting edge 44 is located entirely outside the first imaginary triangle T1 and is not intersected by imaginary extensions of the three locating surfaces 42 which define the first imaginary triangle T1.

In some embodiments of the present invention, none of the bisector planes $P_B$ may intersect any of the cutting edges 44.

Also in some embodiments of the present invention, as shown in FIG. 5, the three locating surfaces 42 may define a second imaginary triangle T2 in a side view of the cutting insert 24, and each cutting edge 44 may be located entirely outside the second imaginary triangle T2 in the said side view.

Further in some embodiments of the present invention, the three bisector planes $P_B$ may bisect respective corners of the second imaginary triangle T2.

As shown in FIGS. 5 to 7, each cutting edge 44 may be formed at the intersection of a rake surface 48 and a relief surface 50.

In some embodiments of the present invention, as shown in FIGS. 5 and 7, an offset plane $P_O$ parallel to one of the bisector planes $P_B$ and not intersecting the first imaginary triangle T1 may intersect one of the three locating surfaces 42 and the rake surface 48 of an adjacent cutting portion 38.

Figure 8:
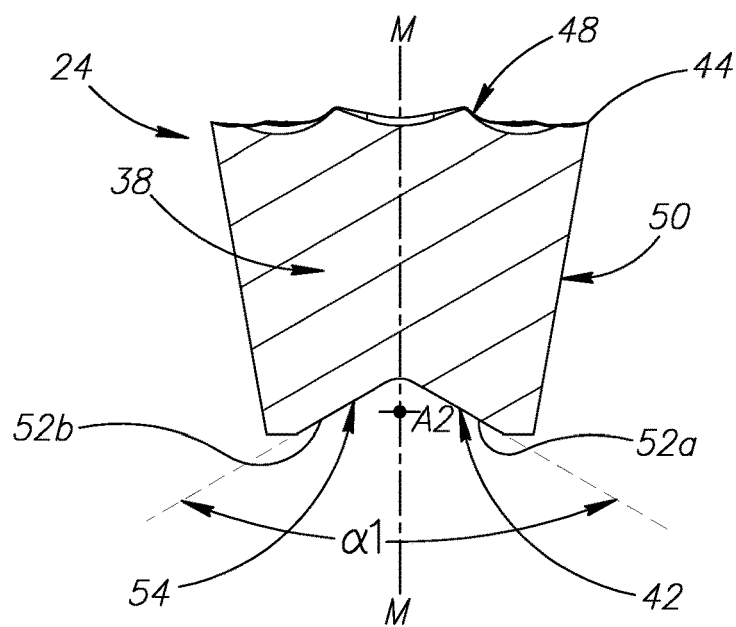
FIG. 8 is a cross-sectional view of the cutting insert shown in FIG. 5, taken along the line VIII-VIII.

As shown in FIG. 8, each locating surface 42 may be V-shaped in a cross-section taken along the offset plane $P_O$.

In some embodiments of the present invention, as shown in FIG. 7, each locating surface 42 may intersect the relief surface 50 of an adjacent cutting portion 38 in a cross-section taken along the median plane M.

Also in some embodiments of the present invention, as shown in FIG. 7, each rake surface 48 may be located entirely outside the first imaginary triangle T1 in a cross-section taken along the median plane M.

As shown in FIG. 8, each locating surface 42 may include a pair of locating flank surfaces 52a, 52b parallely extending along a locating axis A2.

In some embodiments of the present invention, each pair of locating flank surfaces 52a, 52b may form a V-shaped groove 54.

Also in some embodiments of the present invention, as shown in FIG. 7, each locating axis A2 may be perpendicular to one of the bisector planes $P_B$.

Further in some embodiments of the present invention, as shown in FIG. 8, each pair of locating flank surfaces 52a, 52b may form an obtuse external locating angle $\alpha 1$ in a cross-sectional view taken perpendicular to its respective locating axis A2.

It should be appreciated that use of the term "external angle" throughout the description and claims refers to an angle between two planar surface components as measured external to the member on which these surface components are formed.

As shown in FIG. 7, each locating surface 42 may include a locating recess 56, and each locating recess 56 may have an abutment surface 58 transverse to its respective locating axis A2.

In some embodiments of the present invention, at least a portion of each abutment surface 58 may be located inside the first imaginary triangle T1 in a cross-section taken along the median plane M.

According to the present invention, as shown in FIGS. 1 to 3 and 9, the cutting insert 24 is removably securable to the holder portion 28 in any one of three index positions by the at least one clamping member 26, wherein in each index position:

the at least one clamping member 26 is located entirely rearward of a first vertical plane Pv1 containing the central axis A1 and perpendicular to the first direction D1, and one of the three locating surfaces 42 is in clamping contact with the supporting surface 34.

It should be appreciated that by configuring the at least one clamping member 26 to be located entirely rearward of the first vertical plane Pv1 advantageously enables the cutting tool 20 to access and perform cutting operations in restricted spaces.

In some embodiments of the present invention, apart from the single locating surface 42 in clamping contact with the supporting surface 34, no other surface of the cutting insert 24 may be in clamping contact with the holder portion 28 of the tool holder 22.

Also in some embodiments of the present invention, as shown in FIGS. 1 to 3 and 9, the at least one clamping member 26 may operatively engage one of the two locating surfaces 42 not in clamping contact with the supporting surface 34.

Further in some embodiments of the present invention, the first vertical plane Pv1 may be coincident with one of the bisector planes $P_B$.

Yet further in some embodiments of the present invention, the cutting insert 24 may be devoid of a clamping bore extending between and opening out to the two opposing side surfaces 40, and is therefore unable to receive a clamping screw therethrough.

As shown in FIGS. 1 to 3 and 9, the at least one clamping member 26 may be a single clamping wedge 60 slidably retained in a wedge receiving cavity 62 in the holder portion 28.

It should be appreciated that by employing the clamping wedge 60 slidably retained in its wedge receiving cavity 62, the cutting insert 24 can be efficiently indexed with only minor actuation of the clamping wedge 60 and without its removal. This represents a significant improvement over prior art clamping arrangements which have a clamping screw extending through a cutting insert's clamping bore, and in which the clamping screw must be unscrewed and removed in order to permit indexing of the cutting insert.

In some embodiments of the present invention, the wedge receiving cavity 62 may be located rearward of the supporting surface 34.

Also in some embodiments of the present invention as shown in FIGS. 1 and 2, a threaded actuating member 64 may be operatively connected to the clamping wedge 60.

Further in some embodiments of the present invention, the clamping wedge 60 may be slidable in a second direction D2 which is transverse to the first direction D1, and in this instance extends along an upward-to-downward direction $D_U$, $D_D$ of the holder portion's front portion 32.

Figure 9:
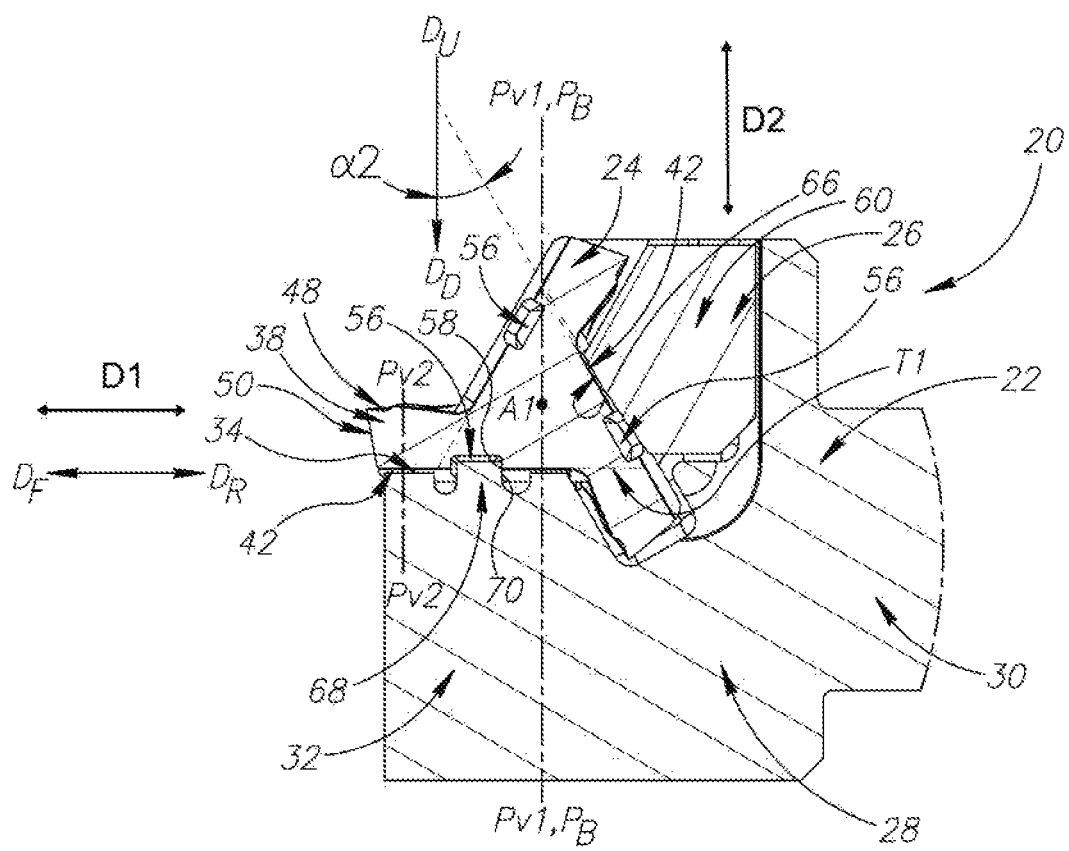
FIG. 9 is a cross-sectional view of the cutting tool shown in FIG. 4, taken along the line IX-IX.

Yet further in some embodiments of the present invention, as shown in FIG. 9, the clamping wedge 60 may have a clamping surface 66 in clamping contact with one of the two locating surfaces 42 not in clamping contact with the supporting surface 34.

As shown in FIG. 9, the clamping surface 66 may be inclined at an acute clamping angle $\alpha 2$ to the second direction D2, in a cross-section taken along the median plane M.

Also as shown in FIG. 9, the second direction D2 may be perpendicular to the first direction D1.

In some embodiments of the present invention, only one cutting portion 38 may be operative in each index position.

Also in some embodiments of the present invention, the operative cutting portion 38 may be located furthest forward of the three cutting portions 38.

As shown in FIG. 9, a second vertical plane Pv2 parallel to the first vertical plane Pv1 and not intersecting the first imaginary triangle T1 may intersect the supporting surface 34 and the locating surface 42 in clamping contact therewith, and also the rake surface 48 of the operative cutting portion 38.

It should be appreciated that by configuring the supporting surface 34 to be located directly 'below' the rake surface 48 of the operative cutting portion 38, enables cutting forces to be efficiently transferred through the cutting insert 24 and absorbed into the holder portion 28.

Figure 10:
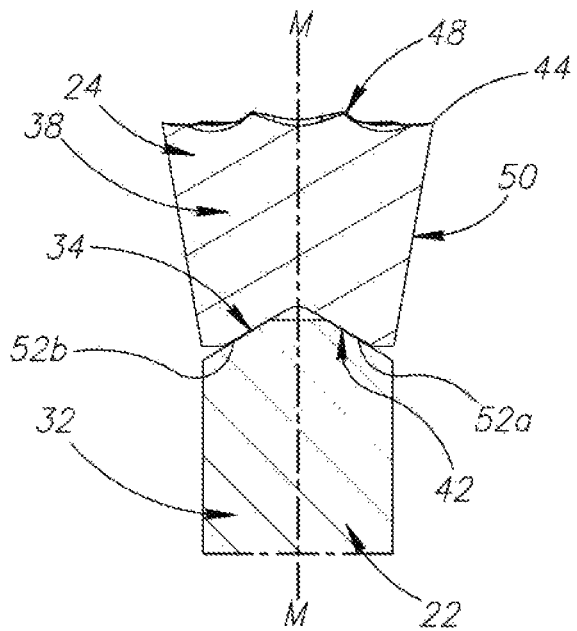
FIG. 10 is a cross-sectional view of the cutting tool shown in FIG. 3, taken along the line X-X.

In some embodiments of the present invention, as shown in FIG. 10, the supporting surface 34 and the locating surface 42 in clamping contact therewith may be correspondingly V-shaped in a cross-section taken in the second vertical plane Pv2.

It should be appreciated that by configuring the supporting surface 34 and the locating surfaces 42 to be V-shaped in a cross-section, enables the cutting insert 24 to be advantageously secured to the holder portion 28 with a high level of stability and resistance to lateral forces transverse to the median plane M.

Also in some embodiments of the present invention, as shown in FIGS. 2, 7 and 9, the supporting surface 34 may include a locating protrusion 68, and the locating protrusion 68 may engage the locating recess 56 of the locating surface 42 in clamping contact with the supporting surface 34.

It should be appreciated that by configuring the locating protrusion 68 to engage with the said locating recess 56, significantly reduces the risk of inadvertent ejection of the cutting insert 24 from the holder portion 28 during cutting operations.

As shown in FIG. 9, the abutment surface 58 of the said locating recess 56 may be forwardly facing and in contact with a rearwardly facing stopper surface 70 of the locating protrusion 68.

In some embodiments of the present invention, as shown in FIG. 9, the stopper surface 70 may be located forward of the first vertical plane Pv1.

It should be appreciated that by locating the stopper surface 70 forward of the first vertical plane Pv1, and thus in close proximity to the operative cutting portion 38, enables the cutting insert 24 to be secured to the holder portion 28 with a high level of accuracy and repeatability, which is particularly advantageous in parting operations.

Figure 11:
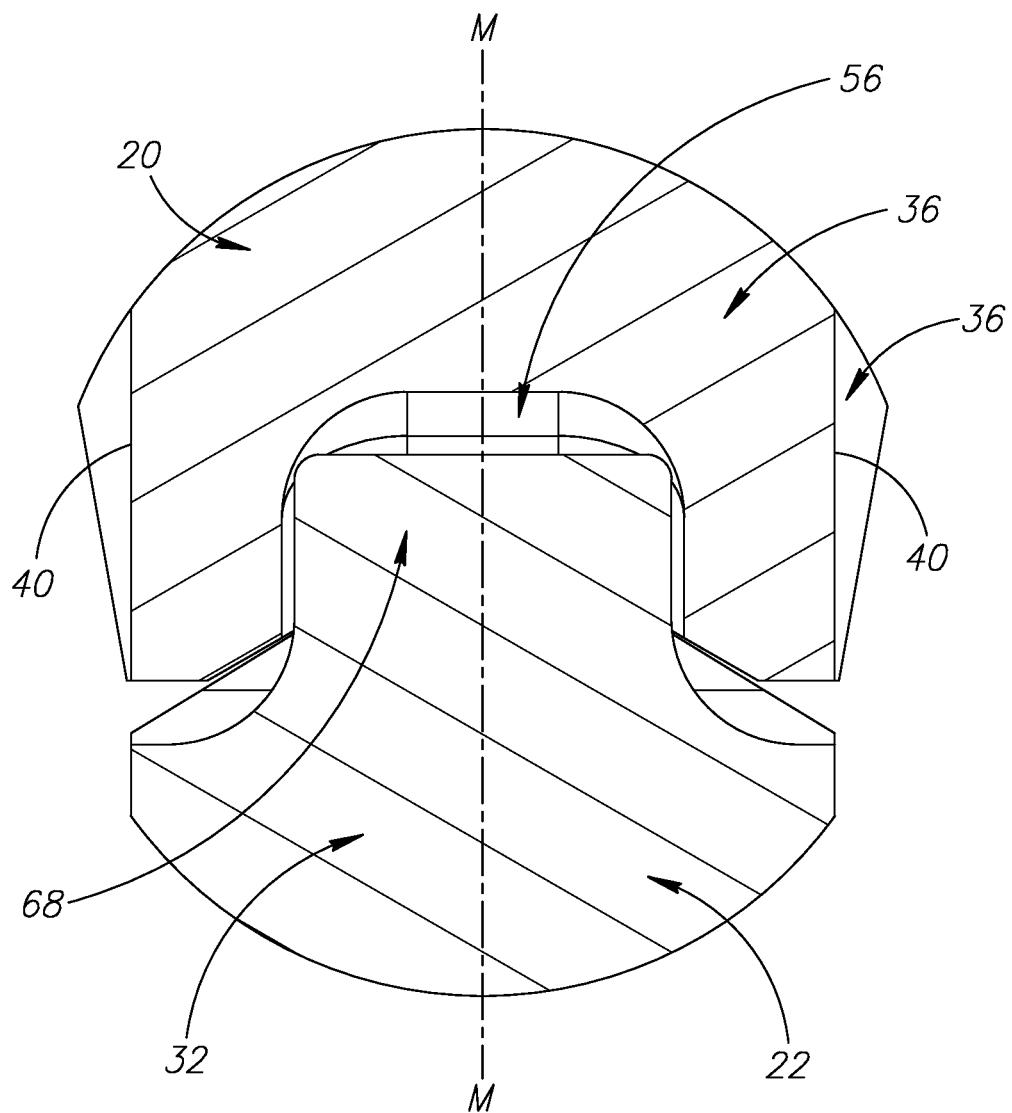
FIG. 11 is a cross-sectional view of the cutting tool shown in FIG. 3, taken along the line XI-XI.

It should be also appreciated from FIGS. 9 and 11, that in the case of no lateral force or an insufficiently large lateral force applied to the cutting insert 24, apart from the abutment surface 58 of the said locating recess 56 being in contact with the stopper surface 70, no other surface of the said locating recess 56 may be in contact with the locating protrusion 68.

In some embodiments of the present invention, as shown in FIG. 6, each side surface 40 may be contained in a side plane $P_s$, and each side plane $P_s$ may intersect each cutting edge 44.

Also as shown in FIG. 6, in a direction parallel to the central axis A1, each cutting portion 38 may have a first maximum width $W1_{MAX}$ defined by its cutting edge 44 which is greater than a second maximum width $W2_{MAX}$ of the central portion 36.

As shown in FIG. 4, the first maximum width $W1_{MAX}$ of each cutting portion 38 may be greater than a third maximum width $W3_{MAX}$ of the blade-shaped front portion 32.

It should be appreciated that by configuring the at least one clamping member 26 to be located entirely rearward of the first vertical plane Pv1, and the first maximum width $W1_{MAX}$ of each cutting portion 38 to be greater than both the second and third maximum widths $W2_{MAX}$, $W3_{MAX}$ of the central portion 36 and the blade-shaped front portion 32, respectively, advantageously enables the cutting tool 20 to perform grooving and parting operations at relatively large depths of insertion.

Although the present invention has been described to a certain degree of particularity, it should be understood that various alterations and modifications could be made without departing from the spirit or scope of the invention as hereinafter claimed.

What is claimed is:

1. A cutting tool (20) comprising a tool holder (22), an indexable cutting insert (24), and at least one clamping member (26),
    the tool holder (22) comprising:
        a shank portion (30), and
        a holder portion (28) connected to the shank portion (30), the holder portion (28) having a blade-shaped front portion (32) with an elongated supporting surface (34), wherein in a side view of the holder portion's front portion (32), the supporting surface (34) extends in a first direction (D1), and
    the cutting insert (24) having a central axis (A1) around which the cutting insert (24) is indexable, and comprising:
        a central portion (36) having two opposing side surfaces (40) and three spaced apart locating surfaces (42) extending therebetween, the central axis (A1) intersecting the two opposing side surfaces (40),
        three cutting portions (38) connected to the central portion (36), each cutting portion (38) formed between two of the three locating surfaces (42) and including a cutting edge (44), and
        a median plane (M) located mid-way between the two opposing side surfaces (40) of the cutting insert (24), the three locating surfaces (42) defining a first imaginary triangle (T1) in a cross-section taken along the median plane (M),
    the cutting insert (24) being removably securable to the holder portion (28) in any one of three index positions by the at least one clamping member (26),
    wherein in each index position:
        the at least one clamping member (26) is located entirely rearward of a first (Pv1) containing the central axis (A1) and perpendicular to said first direction (D1), and
        one of the three locating surfaces (42) is in clamping contact with the supporting surface (34).

2. The cutting tool (20) according to claim 1, wherein the at least one clamping member (26) operatively engages one of the two locating surfaces (42) not in clamping contact with the supporting surface (34).

3. The cutting tool (20) according to claim 1, wherein the at least one clamping member (26) is a single clamping wedge (60) slidably retained in a wedge receiving cavity (62) in the holder portion (28).

4. The cutting tool (20) according to claim 3, wherein:
    the clamping wedge (60) is slidable in a second direction (D2) transverse to said first direction (D1), the clamping wedge (60) having a clamping surface (66) in clamping contact with one of the two locating surfaces (42) not in clamping contact with the supporting surface (34), and
    the clamping surface (66) is inclined at an acute clamping angle ($\alpha 2$) to said second direction (D2) in a cross-section taken along the median plane (M).

5. The cutting tool (20) according to claim 1, wherein:
    only one cutting portion (38) is operative in each index position, and
    the operative cutting portion (38) is located furthest forward of the three cutting portions (38).

6. The cutting tool (20) according to claim 5, wherein:
    each cutting edge (44) is formed at the intersection of a rake surface (48) and a relief surface (50), and
    a second plane (Pv2) parallel to the first vertical plane (Pv1) and not intersecting the first imaginary triangle (T1) intersects:
        (i) the supporting surface (34) and the locating surface (42) in clamping contact therewith, and
        (ii) the rake surface (48) of the operative cutting portion (38).

7. The cutting tool (20) according to claim 6, wherein the supporting surface (34) and the locating surface (42) in clamping contact therewith are correspondingly V-shaped in a cross-section taken in the second plane (Pv2).

8. The cutting tool (20) according to claim 1, wherein:
    each locating surface (42) includes a locating recess (56);
    the supporting surface (34) includes a locating protrusion (68), and
    the locating protrusion (68) engages the locating recess (56) of the locating surface (42) in clamping contact with the supporting surface (34).

9. The cutting tool (20) according to claim 8, wherein the locating recess (56) has a forwardly facing abutment surface (58) in contact with a rearwardly facing stopper surface (70) of the locating protrusion (68).

10. The cutting tool (20) according to claim 1, wherein in a direction parallel to the central axis (A1):
    each cutting portion (38) has a first maximum width ($W1_{MAX}$) defined by its cutting edge (44) which is greater than both (i) a second maximum width ($W2_{MAX}$) of the central portion (36), and also (ii) a third maximum width ($W3_{MAX}$) of the blade-shaped front portion (32).

11. An indexable cutting insert (24) having a central axis (A1) around which the cutting insert (24) is indexable, comprising:
  a central portion (36) having two opposing side surfaces (40) and three spaced apart locating surfaces (42) extending therebetween, the central axis (A1) intersecting the two opposing side surfaces (40),
  three cutting portions (38), each cutting portion (38) formed between two of the three locating surfaces (42) and including a cutting edge (44), and
  a median plane (M) located mid-way between the two opposing side surfaces (40), the three locating surfaces (42) defining three corresponding sides of a first imaginary triangle (T1) in a cross-section taken along the median plane (M), wherein:
  the median plane (M) intersects each cutting edge (44),
  in a side view of the cutting insert (24) parallel to the central axis (A1):
    three bisector planes ($P_B$) containing the central axis (A1) bisect respective corners of the first imaginary triangle (T1), two of the three bisector planes ($P_B$) intersecting each locating surface (42), and
    each cutting edge (44) is located entirely outside the first imaginary triangle (T1) and is not intersected by imaginary extensions of the three locating surfaces (42) which define the three corresponding sides of the first imaginary triangle (T1);and
  in an end view of the cutting insert (24) perpendicular to the central axis (A1):
    each side surface (40) is contained in a side plane (PS), and each side plane (PS) intersects each cutting edge (44).

12. The cutting insert (24) according to claim 11, wherein in a direction parallel to the central axis (A1):
  each cutting portion (38) has a first maximum width ($W1_{MAX}$) defined by its cutting edge (44) which is greater than a second maximum width ($W2_{MAX}$) of the central portion (36).

13. The cutting insert (24) according to claim 11, wherein:
  each cutting edge (44) is formed at the intersection of a rake surface (48) and a relief surface (50), and
  an offset plane ($P_o$) parallel to one of the bisector planes ($P_B$) and not intersecting the first imaginary triangle (T1) intersects one of the three locating surfaces (42) and the rake surface (48) of an adjacent cutting portion (38).

14. The cutting insert (24) according to claim 13, wherein each locating surface (42) intersects the relief surface (50) of an adjacent cutting portion (38) in a cross-section taken along the median plane (M).

15. The cutting insert (24) according to claim 13, wherein each locating surface (42) is V-shaped in a cross-section taken along the offset plane ($P_o$).

16. The cutting insert (24) according to claim 11, wherein each locating surface (42) includes a pair of locating flank surfaces (52a, 52b) parallely extending along a locating axis (A2).

17. The cutting insert (24) according to claim 16, wherein each pair of locating flank surfaces (52a, 52b) forms a V-shaped groove (54).

18. The cutting insert (24) according to claim 16, wherein:
  each locating surface (42) includes a locating recess (56), and
  each locating recess (56) has an abutment surface (58) transverse to its respective locating axis (A2).

19. The cutting insert (24) according to claim 11, wherein:
  each cutting portion (38) has a single cutting edge (44), and
  none of the bisector planes ($P_B$) intersects any of the cutting edges (44).

20. The cutting insert (24) according to claim 11, wherein:
  the cutting insert (24) is devoid of a clamping bore extending between and opening out to the two opposing side surfaces (40).

21. A cutting tool (20) comprising:
  a tool holder (22) comprising:
    a shank portion (30), and
    a holder portion (28) connected to the shank portion, the holder portion (28) having a blade-shaped front portion (32) with an elongated supporting surface (34), wherein in a side view of the holder portion's front portion (32), the supporting surface (34) extends in a first direction (D1),
  at least one clamping member (26); and
  an indexable cutting insert (24) retained in the holder portion (28) in any one of three index positions by the at least one clamping member (26);
  wherein:
  the indexable cutting insert (24) has a central axis (A1) around which the cutting insert (24) is indexable, and comprises:
  a central portion (36) having two opposing side surfaces (40) and three spaced apart locating surfaces (42) extending therebetween, the central axis (A1) intersecting the two opposing side surfaces (40),
  three cutting portions (38), each cutting portion (38) formed between two of the three locating surfaces (42) and including a cutting edge (44), and
  a median plane (M) located mid-way between the two opposing side surfaces (40), the three locating surfaces (42) defining a first imaginary triangle (T1) in a cross-section taken along the median plane (M), wherein:
  the median plane (M) intersects each cutting edge (44),
  three bisector planes ($P_B$) containing the central axis (A1) bisect respective corners of the first imaginary triangle (T1), two of the three bisector planes ($P_B$) intersecting each locating surface (42), and
  in a side view of the cutting insert (24), each cutting edge (44) is located entirely outside the first imaginary triangle (T1) and is not intersected by imaginary extensions of the three locating surfaces (42) which define the first imaginary triangle (T1).

22. The cutting tool (20) according to claim 21, wherein in each index position:
  the at least one clamping member (26) is located entirely rearward of a first plane (Pv1) containing the central axis (A1) and perpendicular to said first direction (D1), and
  one of the three locating surfaces (42) is in clamping contact with the supporting surface (34).

23. An indexable cutting insert (24) having a central axis (A1) around which the cutting insert (24) is indexable, comprising:
  a central portion (36) having two opposing side surfaces (40) and three spaced apart locating surfaces (42) extending therebetween, the central axis (A1) intersecting the two opposing side surfaces (40),
  three cutting portions (38), each cutting portion (38) formed between two of the three locating surfaces (42) and including a cutting edge (44), and
  a median plane (M) located mid-way between the two opposing side surfaces (40), the three locating surfaces

(42) defining three corresponding sides of a first imaginary triangle (T1) in a cross-section taken along the median plane (M), wherein:

the median plane (M) intersects each cutting edge (44), and in a side view of the cutting insert (24) parallel to the central axis (A1):

three bisector planes ($P_B$) containing the central axis (A1) bisect respective corners of the first imaginary triangle (T1), two of the three bisector planes ($P_B$) intersecting each locating surface (42), and each cutting edge (44) is located entirely outside the first imaginary triangle (T1) and is not intersected by imaginary extensions of the three locating surfaces (42) which define the three corresponding sides of the first imaginary triangle (T1).

* * * * *